(12) United States Patent
Busby

(10) Patent No.: US 10,215,210 B2
(45) Date of Patent: Feb. 26, 2019

(54) BLIND FASTENER

(71) Applicant: Arconic Inc., Pittsburgh, PA (US)

(72) Inventor: Donald C. Busby, Woodway, TX (US)

(73) Assignee: Arconic Inc., Pittsburgh, PA (US)

( * ) Notice: Subject to any disclaimer, the term of this patent is extended or adjusted under 35 U.S.C. 154(b) by 244 days.

(21) Appl. No.: 15/353,126

(22) Filed: Nov. 16, 2016

(65) Prior Publication Data

US 2017/0138383 A1    May 18, 2017

Related U.S. Application Data

(60) Provisional application No. 62/256,381, filed on Nov. 17, 2015.

(51) Int. Cl.
| | |
|---|---|
| *F16B 13/06* | (2006.01) |
| *F16B 19/10* | (2006.01) |
| *F16B 39/22* | (2006.01) |
| *F16B 29/00* | (2006.01) |

(52) U.S. Cl.
CPC ........ *F16B 13/066* (2013.01); *F16B 19/1072* (2013.01); *F16B 29/00* (2013.01); *F16B 39/22* (2013.01)

(58) Field of Classification Search
CPC . F16B 13/066; F16B 19/1045; F16B 19/1072
USPC ......................................... 411/34, 45–53, 55
See application file for complete search history.

(56) References Cited

U.S. PATENT DOCUMENTS

| | | | |
|---|---|---|---|
| 2,324,142 A | 7/1943 | Eklund | |
| 2,381,050 A * | 8/1945 | Hardinge | ............ A61B 17/742 |
| | | | 411/55 |
| 2,531,048 A | 11/1950 | Huck | |
| 2,531,049 A | 11/1950 | Huck | |
| 2,764,045 A | 9/1956 | Koenig | |
| 2,863,351 A | 12/1958 | Vaughn | |

(Continued)

FOREIGN PATENT DOCUMENTS

| | | |
|---|---|---|
| AT | 296 572 B | 2/1972 |
| CA | 2868329 | 5/2015 |

(Continued)

OTHER PUBLICATIONS

International Search Report and Written Opinion dated Apr. 28, 2016, issued by the European Patent Office in International (PCT) Application No. PCT/US2016/014229 (12 pages).

(Continued)

*Primary Examiner* — Flemming Saether
(74) *Attorney, Agent, or Firm* — Greenberg Traurig, LLP

(57) ABSTRACT

A fastener including a bolt having a head, a shank portion, and an annular groove located intermediate the head and the shank portion, and a sleeve having a head, a shank portion, an inner cavity, a recess located in the head of the sleeve, and an annular tab located at a bottom of the recess and proximate to the shank portion of the sleeve. The sleeve receives the bolt such that the shank portion of the bolt is positioned within the inner cavity of the sleeve and the head of the bolt is positioned within the recess of the head of the sleeve. When the bolt is in an installed position within the sleeve, the annular tab of the sleeve is deformed and engages the annular groove of the bolt.

8 Claims, 3 Drawing Sheets

(56) References Cited

U.S. PATENT DOCUMENTS

| | | | |
|---|---|---|---|
| 2,955,504 A * | 10/1960 | Lovrinch | F16B 13/066 411/51 |
| 2,959,999 A * | 11/1960 | Wing | B21J 15/043 411/49 |
| 2,971,425 A | 2/1961 | Blakeley | |
| 3,029,665 A | 4/1962 | Baugh et al. | |
| 3,107,572 A | 10/1963 | Orloff | |
| 3,136,203 A * | 6/1964 | Davis | F16B 19/1054 29/509 |
| 3,196,733 A * | 7/1965 | Cohen | E04D 3/3606 29/525.04 |
| 3,215,024 A | 11/1965 | Brilmeyer et al. | |
| 3,277,771 A | 10/1966 | Reynolds | |
| 3,313,200 A * | 4/1967 | Fischer | E04C 2/08 411/53 |
| 3,345,900 A | 10/1967 | Villo | |
| 3,411,398 A * | 11/1968 | Blakeley | F16B 19/1054 411/41 |
| 3,443,474 A | 5/1969 | Blakeley et al. | |
| 3,796,125 A | 3/1974 | Campbell et al. | |
| 3,866,998 A | 2/1975 | Iantorno | |
| 3,915,053 A | 10/1975 | Buhl | |
| 4,299,519 A | 11/1981 | Corbett | |
| 4,312,613 A | 1/1982 | Binns | |
| 4,447,077 A | 5/1984 | Palmer | |
| 4,472,096 A | 9/1984 | Ruhl et al. | |
| 4,531,871 A | 7/1985 | Sigmund | |
| 4,597,263 A | 7/1986 | Corbett | |
| 4,659,271 A | 4/1987 | Pratt et al. | |
| 4,813,834 A | 3/1989 | Smith | |
| 4,832,548 A | 5/1989 | Strobel | |
| 4,867,625 A | 9/1989 | Dixon | |
| 4,878,372 A | 11/1989 | Port et al. | |
| 4,921,384 A | 5/1990 | Nordyke | |
| 4,943,196 A | 7/1990 | Dahl | |
| 4,950,115 A | 8/1990 | Sadri | |
| 4,995,777 A | 2/1991 | Warmington | |
| 5,049,016 A | 9/1991 | Nordyke | |
| 5,090,852 A | 2/1992 | Dixon | |
| 5,125,778 A | 6/1992 | Sadri | |
| 5,252,014 A | 10/1993 | Andrews | |
| 5,315,755 A | 5/1994 | Fulbright et al. | |
| 5,498,110 A | 3/1996 | Stencel et al. | |
| 5,548,889 A | 8/1996 | Smith et al. | |
| 5,604,968 A | 2/1997 | Fulbright et al. | |
| 5,620,287 A | 4/1997 | Pratt | |
| 5,634,751 A | 6/1997 | Stencel et al. | |
| 5,816,761 A | 10/1998 | Cassatt et al. | |
| 6,036,418 A | 3/2000 | Stencel et al. | |
| 6,213,698 B1 | 4/2001 | Cosenza | |
| 6,233,802 B1 | 5/2001 | Fulbright | |
| 6,234,734 B1 * | 5/2001 | Klippel | F16B 19/1045 411/42 |
| 6,235,582 B1 | 5/2001 | Chen | |
| 6,325,582 B1 | 12/2001 | Sadri et al. | |
| 6,497,024 B2 | 12/2002 | Fulbright | |
| 6,702,684 B2 | 3/2004 | Harbin et al. | |
| 6,893,196 B2 * | 5/2005 | Wille | F16B 19/1072 411/183 |
| 7,195,438 B2 | 3/2007 | Harbin et al. | |
| 7,293,339 B2 | 11/2007 | Mercer et al. | |
| 7,308,842 B2 | 12/2007 | Hugnagl et al. | |
| 7,857,563 B2 * | 12/2010 | Pratt | F16B 19/1054 411/34 |
| 7,891,924 B2 | 2/2011 | Mercer et al. | |
| 8,297,897 B2 | 10/2012 | Auriol et al. | |
| 8,322,015 B2 | 12/2012 | Pratt et al. | |
| 8,348,566 B2 | 1/2013 | Pratt | |
| 8,621,734 B2 | 1/2014 | Mercer et al. | |
| 8,727,685 B2 | 5/2014 | Corbett | |
| 8,777,533 B2 | 7/2014 | Hufnagl et al. | |
| 8,979,453 B2 | 3/2015 | Hufnagl et al. | |
| 2008/0247841 A1 | 10/2008 | Mercer et al. | |
| 2009/0053006 A1 | 2/2009 | Hufnagl et al. | |
| 2010/0074710 A1 | 3/2010 | Auriol et al. | |

FOREIGN PATENT DOCUMENTS

| | | |
|---|---|---|
| CN | 1791493 A | 6/2006 |
| CN | 101360920 A | 2/2009 |
| CN | 101668956 A | 3/2010 |
| CN | 101912941 A | 12/2010 |
| CN | 2013 2 0192803.2 | 4/2013 |
| CN | 201310132686.5 | 4/2013 |
| CN | 203176114 U | 9/2013 |
| CN | 204458745 U | 7/2015 |
| EP | 0 351 219 A2 | 1/1990 |
| GB | 1 604 727 A | 12/1981 |
| JP | 2010537139 A | 12/2010 |
| JP | 5878672 | 2/2016 |
| TW | 557338B B | 10/2003 |
| WO | 00/28224 A1 | 5/2000 |
| WO | 2007/100906 A2 | 9/2007 |
| WO | 2015/116444 A1 | 8/2015 |

OTHER PUBLICATIONS

Huck Fasteners, An Alcoa business, 3724 East Columbia Street, Tucson, AZ 85714 BLIND BOLT Engineering Standard Diagram No. UAB100-EU, SK12771, Issued Dec. 8, 2001; 4 pages.

Huck Fasteners, An Alcoa Business, 3724 East Columbia Street, Tucson, AZ 85714 BLIND BOLT Engineering Standard Diagram No. UAB100-MV, SK12772, Issued Dec. 13, 2001; 3 pages.

Huck Fasteners, An Alcoa Business, 3724 East Columbia Street, Tucson, AZ 85714 BLIND BOLT Engineering Standard Diagram No. UABP-EU, SK12756, Issued Sep. 20, 2001; 4 pages.

Alcoa Fastening Systems, 3724 East Columbia Street, Tucson, AZ 85714 BLIND BOLT Engineering Standard Diagram No. UAB130-EU, SK12711, Issued Jan. 31, 2001; 4 pages.

Alcoa Fastening Systems, 3724 East Columbia Street, Tucson, AZ 85714 BLIND BOLT Engineering Standard Diagram No. UAB130-MV, SK12742, Issued Jul. 12, 2001; 3 pages.

Alcoa Fastening Systems, 3724 East Columbia Street, Tucson, AZ 85714 BLIND BOLT Engineering Standard Diagram No. UAB6127-EU, SK12770, Issued Dec. 8, 2001; 3 pages.

Alcoa Fastening Systems, 3724 East Columbia Street, Tucson, AZ 85714, BLIND BOLT Engineering Standard Diagram No. OUAB130-EU, SK12801, Issued Apr. 19, 2004; 4 pages.

Alcoa Fastening Systems, 3724 East Columbia Street, Tucson, AZ 85714, BLIND BOLT Engineering Standard Diagram No. OUAB6127-EU, SK12802, Issued Apr. 19, 2004; 3 pages.

Alcoa Fastening Systems, 3724 East Columbia Street, Tucson, AZ 85714, BLIND BOLT Engineering Standard Diagram No. OUABP-EU, SK12803, Issued Apr. 19, 2004; 4 pages.

International Search Report and Written Opinion dated Apr. 21, 2015, issued by the European Patent Office in International (PCT) Application No. PCT/US2015/012153 (9 pages).

International Search Report and Written Opinion dated Mar. 2, 2017, issued by the European Patent Office in International (PCT) Application No. PCT/US2016/062259 (12 pages).

* cited by examiner

BLIND FASTENER

CROSS-REFERENCE TO RELATED APPLICATION

This application is a Section 111(a) application relating to and claiming the benefit of commonly-owned, U.S. Provisional Patent Application Ser. No. 62/256,381, filed Nov. 17, 2015, entitled "HIGH SPEED BLIND FASTENER," the content of which is incorporated herein by reference in its entirety.

FIELD OF THE INVENTION

The present invention relates to fasteners and, more particularly, to high speed blind fasteners.

BACKGROUND OF THE INVENTION

Blind fasteners are commonly used to secure a plurality of work pieces together when it is difficult or impossible to access the blind side of one of the work pieces. In certain applications, it is desirable to control the minimum clamp in the joint of the work pieces and that there is front side visual inspection of the installed fastener.

SUMMARY OF THE INVENTION

In an embodiment, a fastener including a bolt including an elongated shank portion having a first end, a second end opposite the first end, a smooth cylindrical shank portion located proximate to the first end, a threaded portion located at the second end and having a plurality of threads, a head located at the first end, and an annular groove located intermediate the head and the smooth cylindrical shank portion; a sleeve including a first end, a second end opposite the first end of the sleeve, a head located at the first end of the sleeve, an elongated shank portion extending from the head of the sleeve to the second end of the sleeve, an inner wall forming an inner cavity that extends from the first end of the sleeve to the second end of the sleeve, the inner cavity including an elongated portion located within the elongated shank portion of the sleeve and a recess located in the head of the sleeve, and an annular tab located at a bottom portion of the recess and proximate to the elongated shank portion of the sleeve, wherein the sleeve is adapted to receive the bolt such that the shank portion of the bolt is positioned within the elongated portion of the inner cavity of the sleeve and the head of the bolt is positioned within the recess of the head of the sleeve, wherein when the bolt is within an installed position within the sleeve, the annular tab of the sleeve is deformed and engages the annular groove of the bolt.

In another embodiment, the annular tab of the bolt includes an oblique side that extends obliquely relative to a longitudinal axis of the bolt and an axial side that is substantially parallel with the longitudinal axis of the bolt when the bolt is in an uninstalled position. In any of the foregoing embodiments, the bolt is within its installed position, the annular tab of the bolt is deformed such that the oblique side and axial side of the annular tab shift inwardly. In any of the foregoing embodiments, further including a nut having internal threads that are adapted to engage threadedly the plurality of threads of the threaded portion of the bolt. In any of the foregoing embodiments, the nut includes first end, a second end opposite the first end of the nut, and a tapered portion located at the first end of the nut. In any of the foregoing embodiments, the elongated portion of the inner cavity of the sleeve is adapted to deform and receive the nut when the bolt is installed in its installed position. In any of the foregoing embodiments, the nut includes a plurality of splines extending from the first end of the nut to the second end of the nut. In any of the foregoing embodiments, the shank portion of the sleeve includes an annealed area located proximate to the second end of the sleeve, and wherein the sleeve is adapted to form a bulb when the fastener is in its installed position.

In another embodiment, a fastener including a bolt including an elongated shank portion having a first end, a second end opposite the first end, a smooth cylindrical shank portion located proximate to the first end, a threaded portion located at the second end and having a plurality of threads, and a head located at the first end; a sleeve including a first end, a second end opposite the first end of the sleeve, a head located at the first end of the sleeve, an elongated shank portion extending from the head of the sleeve to the second end of the sleeve, an inner wall forming an inner cavity that extends from the first end of the sleeve to the second end of the sleeve, the inner cavity including an elongated portion located within the elongated shank portion of the sleeve; and a nut having internal threads that are adapted to engage threadedly the plurality of threads of the threaded portion of the bolt, wherein the sleeve is adapted to receive the bolt such that the shank portion of the bolt is positioned within the elongated portion of the inner cavity of the sleeve and the head of the bolt is positioned against the head of the sleeve.

In the foregoing embodiment, the nut includes first end, a second end opposite the first end of the nut, and a tapered portion located at the first end of the nut. In any of the foregoing embodiments, the elongated portion of the inner cavity of the sleeve is adapted to deform and receive the nut when the bolt is installed in its installed position. In any of the foregoing embodiments, the nut includes a plurality of splines extending from the first end of the nut to the second end of the nut.

In an embodiment, the fastener is a spin/torque installed blind fastener featuring front side visual inspection of installation and an anti-back out locking feature by way of the nut. The front side flush condition between the bolt and the sleeve verifies lock formation and clamp load. The fastener has no pintail or pin break, this utilizing less material. The fastener may be installed with hand tools or standard power tools and guns.

DETAILED DESCRIPTION OF THE DRAWINGS

Figure 1:
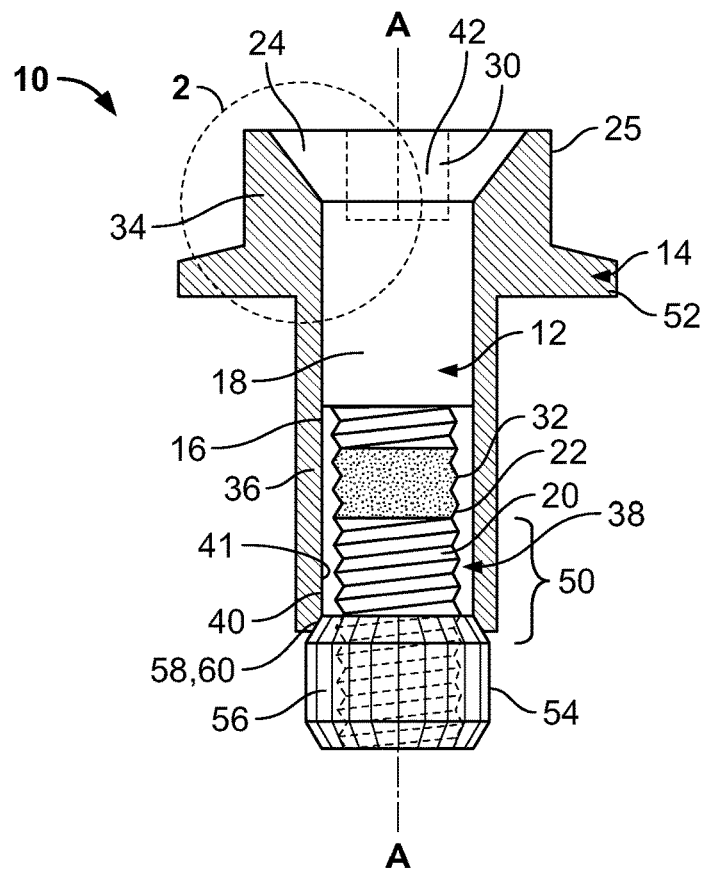
FIG. 1 is a side cross-sectional view of a high speed blind fastener in accordance with an embodiment.
Figure 2A:
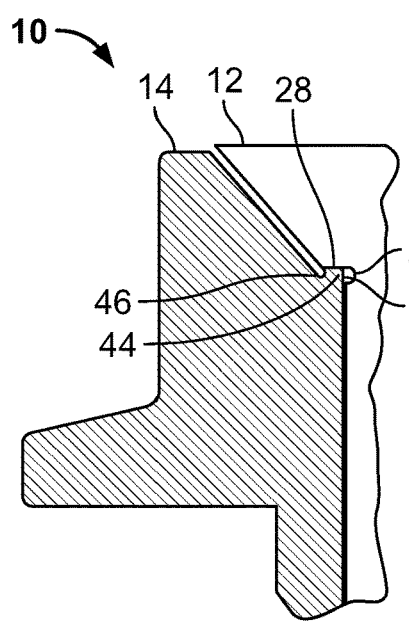
FIGS. 2A and 2B are close-up views of Detail 2 of the blind fastener shown in FIG. 1, but showing the blind fastener prior to installation and after installation, respectively.
Figure 2B:
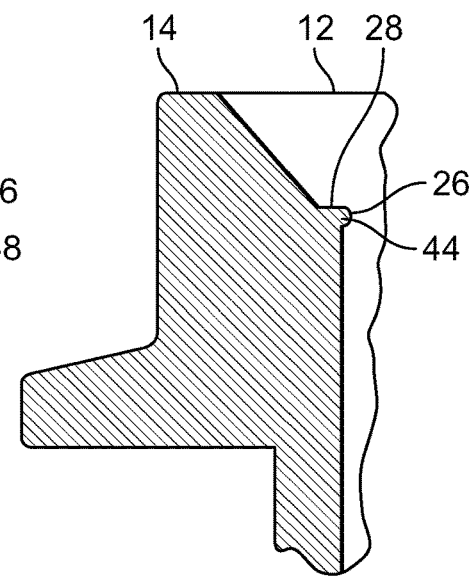

Referring to FIGS. 1 and 2, in an embodiment, a blind fastener 10 including a bolt 12 (e.g., a pin member) and a sleeve 14 that is adapted to receive the bolt 12 therein. In an embodiment, the bolt 12 includes an elongated shank 16 having a smooth cylindrical shank portion 18, a threaded portion 20 having a plurality of threads 22, and an enlarged head 24 formed at one end of the elongated shank 16 proximate to the smooth cylindrical shank portion 18. In an embodiment, the head 24 is a countersunk head. In an embodiment, the head 24 includes an external hex 25 that is adapted to receive a tool, such as a wrench. In an embodiment, the bolt 12 includes an annular groove 26 that is located intermediate the smooth cylindrical shank portion 18 and the head 24 (see FIG. 2). In an embodiment, the annular groove 26 forms an underside portion 28 on the head 24. In an embodiment, the underside portion 28 is perpendicular to a longitudinal axis A-A of the bolt 12. In an embodiment, the head 24 includes a recess 30 that is sized and shaped to receive a tool for torqueing the bolt 12. In an embodiment, the recess 30 is hexagonal in shape. In another embodiment, the recess 30 is a torx recess. In an embodiment, the plurality of threads 22 includes a double-lead thread. In an embodiment, a pressure sensitive epoxy patch 32 is coated on a portion of the threaded portion 20 of the bolt 12.

Still referring to FIGS. 1 and 2, in an embodiment, the sleeve 14 includes a head 34 located at a first end of the sleeve 14, and an elongated shank portion 36 extending from the head 34 to a second end of the sleeve 14. In an embodiment, the sleeve 14 includes an inner cavity 38 extending from the first end to the second end of the sleeve 14. In an embodiment, the inner cavity 38 includes an elongated portion 40 formed by an inner wall 41 and a recess 42 located proximate to the first end of the sleeve 14. In an embodiment, the recess 42 is a countersunk recess that is sized and shaped to receive the head 24 of the bolt 12 when the bolt 12 is installed within the sleeve 14. In an embodiment, an annular tab 44 is located at a bottom portion of the recess 42 and proximate to one end of the elongated portion 40 of the recess 42. In an embodiment, the annular tab 44 has an oblique side 46 that extends obliquely relative to the longitudinal axis A-A of the bolt 12 and an axial side 48 that is generally parallel with the longitudinal axis of the bolt 12 when the bolt 12 is in an uninstalled position. As will be described below, the annular tab 44 is adapted to engage the annular groove 26 of the bolt 12 when the bolt 12 is installed within the sleeve 14. In an embodiment, a portion of the elongated portion 40 of the sleeve 14 includes an end band annealed area 50. In an embodiment, the head 34 of the sleeve 14 includes an annular flange 52.

In an embodiment, the fastener 10 includes a threaded nut 54 that is adapted to engage threadedly the external threads 22 of the bolt 12. In an embodiment, the nut 54 includes a plurality of external splines 56. In an embodiment, the nut 54 includes tapered portions 58 having anti-rotation splines 60.

Figure 3:
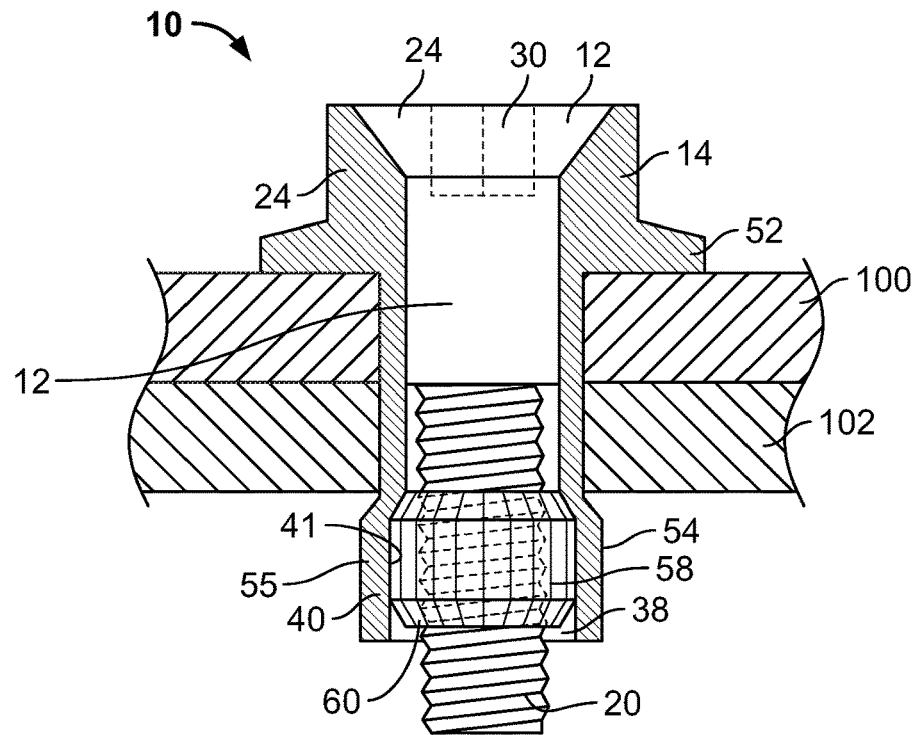
FIG. 3 is a side cross-sectional view of the blind fastener shown in FIGS. 1 and 2 in an installed position as part of a blind fastener and within a plurality of work pieces.

Referring to FIGS. 2A through 4, the fastener 10 is installed by inserting a tool into the recess 30 of the head 24 of the bolt 12 and using the tool to rotate the bolt 12. In an embodiment, this commences the action of drawing the anti-rotational splines 56, 60 of the nut 54 into the elongated portion 40 of the inner cavity 38 of the sleeve 14. The sleeve 14 expands as the nut 54 moves up along the threaded portion 20 of the bolt 12 and inside the sleeve 14 until a swell 55 of the sleeve 14 is formed and reaches a blind slide of a plurality of work pieces 100, 102 to be secured to one another. When this occurs, the clamp on the work pieces 100, 102 is generated and the bolt 12 moves toward the annular locking tab 44. Also during installation, when the head 24 of the bolt 12 engages the recess 42 of the sleeve, the annular tab 44 of the sleeve engages the underside portion 28 of the head 24 of the bolt 12. During installation, the force of the bolt 12 into the sleeve 14 deforms the annular tab 44 so that the oblique and axial sides 46, 48 each shift inwardly and the tab 44 locks with the annular groove 26 of the bolt 12. In an embodiment, the lock between the tab 44 and the groove 26 is formed before final clamp generation of the fastener 10. In an embodiment, accurate clamp force is generated by the pre-determined load required to set the locking engagement between the tab 44 and the groove 26 which is a direct correlation with one another. FIG. 3 shows the fastener 10 in a fully installed position within the plurality of work pieces 100, 102. In this regard, the flange 52 engages the work piece 100, while the nut 54 is forced within the cavity 38 of the sleeve 14 and expands the swell 55 of the elongated portion 40 of the sleeve 14. The splines 56, 60 of the nut 54 engage the inner wall 41 of the sleeve 14 to prevent rotation of the nut 54 relative to the sleeve 14. Visual inspection of the installation of the fastener 10 is achieved by verifying the flush condition of the head 24 of the bolt 12 relative to the sleeve 14. Moreover, the minimum clamp is assured on the work pieces 100, 102

Figure 4:
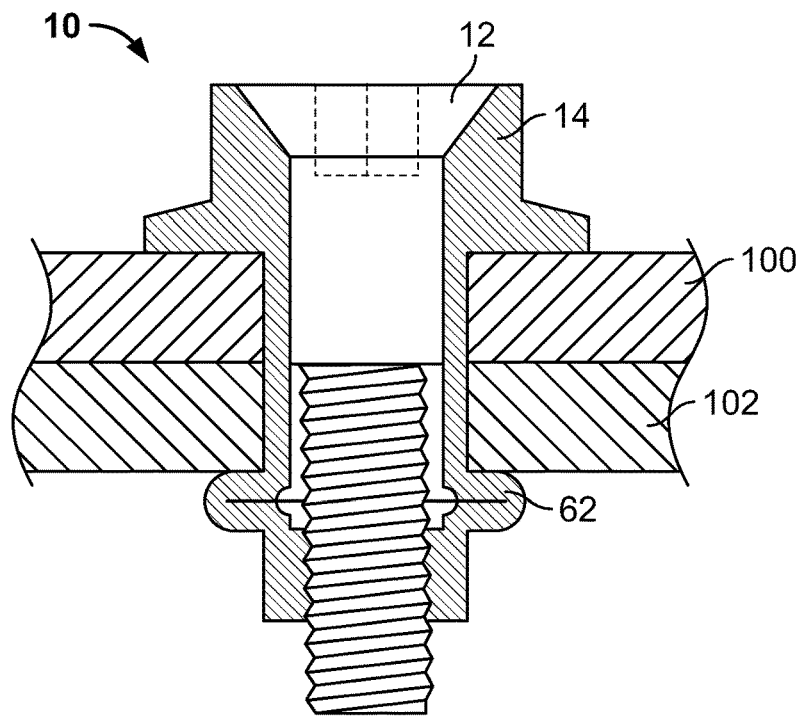
FIG. 4 is a side cross-sectional view of the blind fastener shown in FIG. 3, but with a blind bolt employed by the fastener shown with an optional threaded bulbing sleeve design.

Referring to FIG. 4, in another embodiment, the fastener 10 need not include the nut 54. In this regard, the annealed area 50 (as shown in FIG. 1) enables the formation of a bulb 62 which engages the work piece 102 and clamps the work pieces 100, 102 together.

Figure 5:
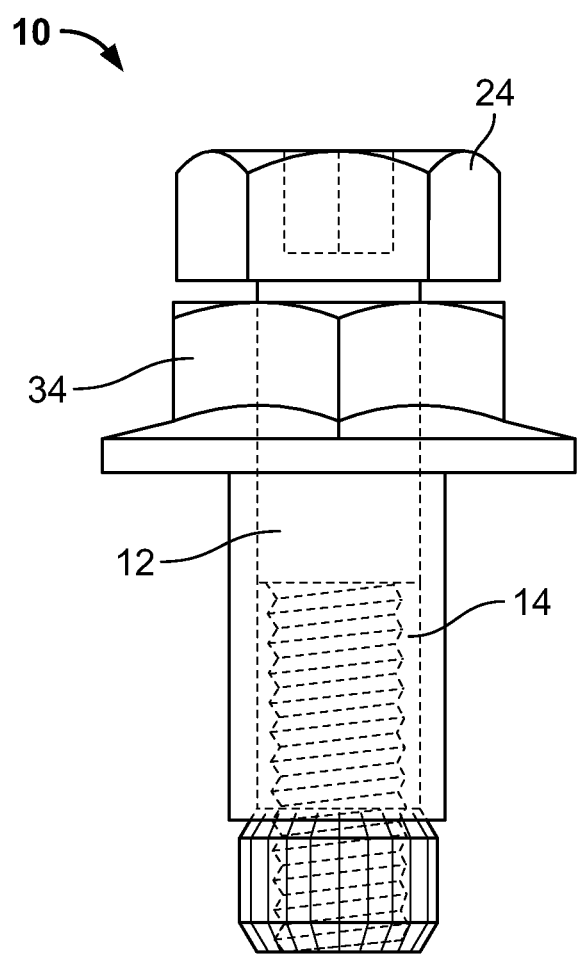
FIG. 5 is a side view of another embodiment of a high speed blind fastener.

Referring to FIG. 5, in another embodiment, the fastener 10 has a similar construction, except that the head 24 of the bolt 12 is a protruding head. In an embodiment, the head 34 of the sleeve 14 is a protruding head. When the bolt 12 is installed in the sleeve 14, the head 24 of the bolt 12 engages the head 34 of the sleeve to close the gap therebetween.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:
1. A fastener, comprising:
a bolt including an elongated shank portion having a first end, a second end opposite the first end, a smooth cylindrical shank portion located proximate to the first end, a threaded portion located at the second end and having a plurality of threads, a head located at the first end, and an annular groove located intermediate the head and the smooth cylindrical shank portion;
a sleeve including a first end, a second end opposite the first end of the sleeve, a head located at the first end of the sleeve, an elongated shank portion extending from the head of the sleeve to the second end of the sleeve, an inner wall forming an inner cavity that extends from the first end of the sleeve to the second end of the sleeve, the inner cavity including an elongated portion located within the elongated shank portion of the sleeve and a recess located in the head of the sleeve, and an annular tab located at a bottom portion of the recess and proximate to the elongated shank portion of the sleeve,
wherein the sleeve is adapted to receive the bolt such that the shank portion of the bolt is positioned within the elongated portion of the inner cavity of the sleeve and the head of the bolt is positioned within the recess of the head of the sleeve, wherein when the bolt is within an installed position within the sleeve, the annular tab of the sleeve is deformed and engages the annular groove of the bolt.

2. The fastener of claim 1, wherein the annular tab of the sleeve includes an oblique side that extends obliquely relative to a longitudinal axis of the bolt and an axial side that is substantially parallel with the longitudinal axis of the bolt when the bolt is in an uninstalled position.

3. The fastener of claim 2, wherein when the bolt is within its installed position, the annular tab of the bolt is deformed such that the oblique side and axial side of the annular tab shift inwardly.

4. The fastener of claim 3, further comprising a nut having internal threads that are adapted to engage threadedly the plurality of threads of the threaded portion of the bolt.

5. The fastener of claim 4, wherein the nut includes first end, a second end opposite the first end of the nut, and a tapered portion located at the first end of the nut.

6. The fastener of claim 5, wherein the elongated portion of the inner cavity of the sleeve is adapted to deform and receive the nut when the bolt is installed in its installed position.

7. The fastener of claim 6, wherein the nut includes a plurality of splines extending from the first end of the nut to the second end of the nut.

8. The fastener of claim 3, wherein the shank portion of the sleeve includes an annealed area located proximate to the second end of the sleeve, and wherein the sleeve is adapted to form a bulb when the fastener is in its installed position.

\* \* \* \* \*